United States Patent
Matusch

[11] 3,970,469
[45] July 20, 1976

[54] EXTRACTION TOWER

[75] Inventor: Siegfried Matusch, Braunschweig, Germany

[73] Assignee: Braunschweigische Maschinenbauanstalt, Braunschweig, Germany

[22] Filed: Nov. 7, 1975

[21] Appl. No.: 629,846

[30] Foreign Application Priority Data
Nov. 30, 1974   Germany.............................. 2456774

[52] U.S. Cl................................ 127/5; 23/270 R; 127/7
[51] Int. Cl.² .......................................... C13D 1/12
[58] Field of Search ................................ 127/2–7; 23/270 R

[56] References Cited
UNITED STATES PATENTS

| | | | |
|---|---|---|---|
| 2,816,049 | 12/1957 | Heinrich | 127/7 |
| 2,819,190 | 1/1958 | Kaether | 127/7 |
| 2,924,541 | 2/1960 | Kaether | 127/5 X |
| 2,927,007 | 3/1960 | Kaether | 127/7 X |
| 2,950,998 | 8/1960 | Stewart | 127/7 |
| 3,142,589 | 7/1964 | Schaffer | 127/5 X |
| 3,726,715 | 4/1973 | Mushack | 127/3 X |

Primary Examiner—Morris O. Wolk
Assistant Examiner—Sidney Marantz
Attorney, Agent, or Firm—W. G. Fasse; W. W. Roberts

[57] ABSTRACT

An extraction tower for leaching sugar beet cossettes or comminuted sugar cane. A central shaft is rotatably supported in a tower housing. Feed advance wings for the material to be leached are secured to the central shaft with spacings between the wings. Baffle elements are secured to the inside of the tower housing so as to extend into the spacings between adjacent wings. The baffle elements are elongated plates which are secured to the housing wall at a plurality of points, preferably three points so as to simultaneously form a reinforcement of the tower housing. The baffle plates are twisted relative to a longitudinal axis so that one end of a plate has an inwardly and upwardly facing edge, while the opposite edge faces downwardly and vice versa.

6 Claims, 3 Drawing Figures

EXTRACTION TOWER

BACKGROUND OF THE INVENTION

The invention relates to extraction towers, more specifically, to such towers as are used in the production of sugar for the leaching of sugar beet cossettes or comminuted sugar cane in a counter-current flow of leaching liquid. Such towers are conventionally provided with a tower housing and a rotatably supported center shaft in the tower, which is connected to drive means for rotating the center shaft. Feed advance elements in the form of wings and/or worm screws are secured to the rotatable center shaft and spaced from each other along the length of the shaft to provide spacings between adjacent feed advance elements. It is also known to use baffle plates in such towers which reach into the spacings between adjacent feed advance elements. Such baffle plates act as guide plates for the material being leached.

Various embodiments of the just described basic structure are well known in the art, whereby the mentioned guide plates or baffle plates reach radially inwardly from the tower housing. In other words, the baffle plates have a free end pointing toward the central shaft and an opposite end rigidly or rotatably secured to the inner wall of the tower housing. Reference is made in this connection to German Pat. 1,017,549. The guide or baffle plates also have a certain slant of inclination relative to the horizontal in order to cooperate with the feed advance elements of the driven central shaft or the tower in advancing the material to be leached in counter-current fashion through the tower. This cooperation between the feed advance elements of the central shaft and the baffle plates assures a repeated turn-over of the material being leached. Such repeated turn-over or turning of the material is important because it results in an improved, more intensive contact between the material being leached and the leaching liquid. Another advantage of these guide or baffle plates is seen in that they contribute to avoid jamming of the material in the tower since the plates act as guide means which facilitate determining the flow direction of the material being leached.

Conventional extraction towers with the radially inwardly directed guide plates require a relatively strong tower housing construction because the radially outwardly extending ends of the guide plates are secured to the tower wall and the wall must be accordingly rather thick. The tower wall must not only take up the pressure created by the material in the tower, but also those forces must be taken up by the tower wall, which are transmitted from the guide plates into the tower wall. As a result, prior art tower housings require a substantial quantity of material, especially steel and the tower housings are very heavy so that their transport and the assembly of individual tower sections becomes difficult and expensive.

OBJECTS OF THE INVENTION

In view of the foregoing, it is the aim of the invention to achieve the following objects singly or in combination:

to construct a tower of the type described in such a manner that the effect achieved by the guide plates is maintained while simultaneously distributing the loads resulting from securing the guide plates to the inner surface of the tower housing, more evenly over the entire surface of the tower housing to thereby permit a substantially lighter tower structure;

to arrange the guide plates in such a manner inside the tower that the guide plates themselves will contribute to the rigidity of the entire tower structure;

to arrange the guide plates in such a manner that any separation between the material being leached and the leaching liquid is minimized in case the central tower shaft should momentarily stop to rotate; and to construct and arrange the guide plates in such a manner that they improve the flow characteristics and conditions in the extraction tower.

SUMMARY OF THE INVENTION

According to the invention there is provided an extraction tower in which each of the guide or baffle plates which reach into the spacings between adjacent feed advance elements secured to the central shaft of the tower, is secured at several points, preferably at three points, to the inner surface of the tower housing. In this manner the guide or baffle plates function simultaneously as stiffening means for the tower housing. Preferably, the baffle plates are arranged in sets of, for example, three plates forming substantially an equilateral triangle surrounding the centrally located shaft of the tower. In addition to securing both ends of each baffle plate to the tower wall, for example, by welding, the central portion of each baffle plate is preferably also secured to the tower wall, for example, through an intermediate connecting piece welded to the baffle plate and to the tower wall. Further, each baffle plate is twisted relative to a longitudinal central axis of the plate so that the respective edges of the baffle plate sections face up and down and vice versa. By securing the baffle plates to the tower in the manner just described, especially where three baffle plates form substantially the sides of an equilateral triangle, the tower housing is substantially reinforced and stiffened, so that the tower wall itself may now be made from substantially thinner wall material, thus resulting in substantial savings, as well as in a substantial weight reduction.

BRIEF FIGURE DESCRIPTION

In order that the invention may be clearly understood, it will now be described, by way of example, with reference to the accompanying drawings, wherein:

FIG. 1 is a somewhat schematic illustration of a horizontal section through the extraction tower;

FIG. 2 is a side view of a tower according to the invention, whereby the left hand half shows the outside construction, whereas the right side half shows the inner arrangement of the tower with the outer housing wall broken away and with the upper right hand corner of the tower shown in section; and FIG. 3 is an end view of a guide or baffle plate according to the invention in the direction of the arrow A in FIG. 1.

DETAILED DESCRIPTION OF PREFERRED EXAMPLE EMBODIMENTS

Figure 2:
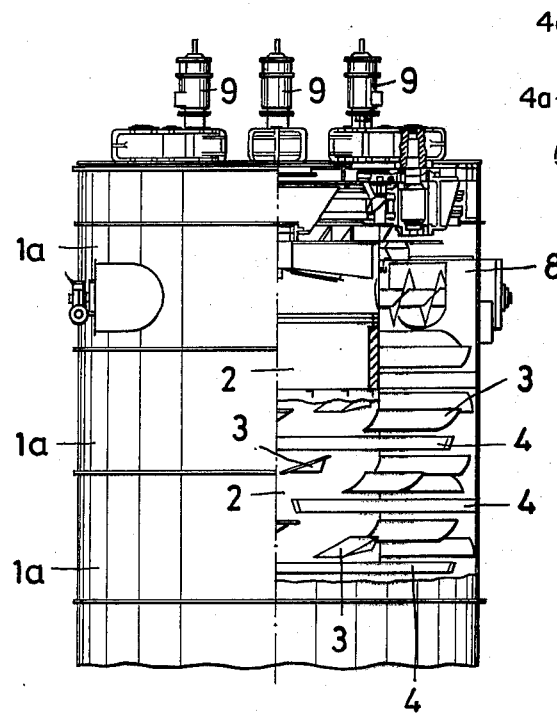

The extraction tower illustrated in the drawings comprises a tower housing 1 made up of several sections 1a, as best seen in FIG. 2. These sections are manufactured separately and secured to each other when the tower is assembled, as is well known. A central shaft 2 is located inside the tower and supported for rotation by bearing means, not shown.

Figure 1:
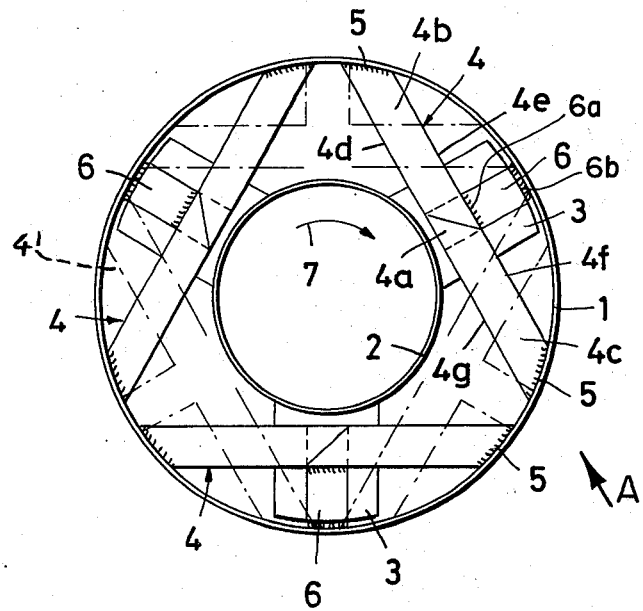

The shaft 2 may be a hollow shaft and has secured to its circumference a plurality of feed advance elements, for example, in the form of wings 3 as shown, or in the form of a worm screw. In both instances the feed advance elements are spaced from each other along the length of the tower to provide spacings between adjacent elements. In the illustrated embodiment the wings 3 are spaced from each other by 120°, as best seen in FIG. 1. As seen in FIG. 2, the wings 3 are also circumferentially spaced by predetermined angles to extend around the shaft 2 in a helical manner. These wings are normally separate elements and are secured to the central shaft when the tower is assembled.

According to the invention, guide plates 4 are arranged in the tower to reach into the spacings between adjacent feed advance elements 3. These plates 4 are preferably arranged in sets, whereby the members of a set are located in a common plane, as shown in FIG. 1 where, for example, three guide or baffle plates 4 are located substantially as sides of an equilateral triangle. The topmost set of baffle plates is shown in full lines. The next set of baffle plates 4' is illustrated in dashed-dotted lines to indicate that it is located in a plane below the plates 4 and below the feed advance element 3. Furthermore, the set of guide plates 4' is angularly displaced relative to the set of plates 4, as best seen in FIG. 1.

Sets of three or more guide plates may be arranged in the tower and each set would be angularly displaced relative to the next adjacent set. The plates extend through the circular tower housing 1 as chords and each plate 4, 4' is secured to the inside of the tower, at least at two points, for example, by welding 5 and preferably also at its center by means of cross pieces 6, e.g. welded at 6a, 6b to the center portion 4a and to the respective opposite point on the inner surface of the housing wall 1. The just described manner of securing the baffle or guide plates to the tower reinforce the tower structure and simultaneously they guide the flow of the material to be leached through the tower.

In the illustrated embodiment the shaft 2 is rotated clockwise as indicated by the arrow 7. The material to be leached such as sugar beet cossetts or comminuted sugar cane is moved upwardly through the tower against the counter-current flow of the leaching liquid. To facilitate this feed advance of the material, the wings 3 are provided with guide surfaces as shown in FIG. 2, whereby the material to be leached is lifted and advanced upwardly by the rotational movement of the shaft 2 and the wings and guide surfaces 3.

Figure 3:
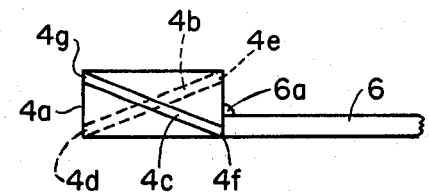

The material to be leached contacts the guide plates 4, whereby the latter due to their shape, as best seen in FIG. 3, impart a guiding force to the material to be leached in the upward direction. For this purpose the guide plates 4 have two sections 4b and 4c, which in themselves are preferably plane, but which are twisted relative to each other and relative to their longitudinal axis in such a manner that the slant of one plane is opposite to that of the other plane. In the simplified illustration of FIG. 3, the sections 4b and 4c are secured to a central portion 4a. However, it will be appreciated that the sections 4b and 4c may simply be twisted at their center so as to smoothly merge into each other, for example, in the manner of a propeller. In any event, the edge 4d facing into the tower and towards the direction 7 of rotation of the shaft 2 is at a lower level than the opposite edge 4e of the section 4b. On the other hand, the edge 4g facing into the tower is at a higher level than the opposite edge 4f facing outwardly. Due to this location of the edges of the guide plates 4 and due to the resulting slant in the respective guide plane sections 4b, 4c the guide plates impart a guiding force to the material to be leached and simultaneously enhance the feed advance of the material toward the output opening 8 of the tower where the leached material is removed from the tower by conventional means, such as a feed screw. This feature of the invention has the advantage that it achieves an efficient intermixing of the material to be leached with the counter-current flow of leaching juice while simultaneously enhancing the feed advance and distribution of the material to be leached.

FIG. 2 illustrates in the right hand portion how the guide and baffle plates 4 reach into the spacings between adjacent wings 3 secured to the shaft 2. The location of the plates 4 intermediate the wings 3 is especially visible in the lower right hand portion of FIG. 2. The upper portion of the shaft is shown in section. The shaft may be hollow and is driven by conventional drive means 9 including motors, as well as gear means to rotate the shaft 2 in the direction of the arrow 7.

From the drawings it is also to be noted that the angular displacement of the sets of guide plates 4, 4' relative to each other, for example, by 60° or by multiples of 60° from level to level within the tower in combination with the wings 3 secured to the shaft 2, there will be sufficient surface area inside the tower so that a sinking of the material to be leached will substantially be prevented when the shaft should stop rotating. This is another advantage of the invention.

From the foregoing disclosure it will be appreciated that the arrangement of the guide surfaces 4, 4' as taught herein achieves the same effect as has been achieved heretofore with radially extending baffle plates, however, with the advantage that a much lighter wall material may be used due to the reinforcement simultaneously provided by the baffle plates 4, 4'.

The above mentioned inclination of the guide plate sections 4b, 4c not only enhances the feed advance of the material being leached, but also provides a repeated turn-over of the material being leached, whereby a more intimate contact between the down-flowing leaching liquid and the material being leached is assured, and whereby simultaneously a distribution action is accomplished which tends to prevent clogging. Moreover, the angular displacement of sets of guide plates around the central shaft 2 by 60° from set to set or multiples of 60° prevents any undesirable separation between material and liquid if the shaft should temporarily stop its rotation. This feature has the advantage that the distribution of solid components will be maintained uniform throughout the tower even if short stoppages should occur, thus preventing the accumulation of solid components in the lower part of the tower. Such accumulation heretofore made it necessary to remove the material from the tower and start it again. Now short stoppages are possible and the shaft may be restarted without any prior material removal. The combination of guide plates arranged as taught herein with the feed advance elements of the shaft prevent the above mentioned accumulation of solid materials at the lower part of the tower, because any separation as a result of short stoppages of the shaft is limited to the particular levels established by the guide plates and the respective feed elements of the shaft, because this combination provides a stop function against the sinking of solid particles downwardly in the tower.

Incidentally, it is preferable to keep the individual guide plate sections 4b, 4c plane and slanted relative to each other. It was found that this particular shape of the guide plates assures particularly advantageous flow conditions throughout the extraction tower.

Although the invention has been described with reference to specific example embodiments, it is to be understood, that it is intended to cover all modifications and equivalents within the scope of the appended claims.

What is claimed is:

1. An extraction tower comprising a tower housing, a central shaft rotatably supported in said housing, feed advance means secured to said central shaft and spaced along the length of the shaft to provide spacings between adjacent feed advance means, and baffle means secured to said tower housing inside thereof at such locations that the baffle means reach into said spacings between adjacent feed advance means, said baffle means comprising a plurality of elongated baffle elements, means securing each of said elongated baffle elements to said tower housing at a plurality of points inside of the tower housing to reinforce the latter, said elongated baffle elements being distributed about the inside of the tower to substantially surround said central shaft, said baffle elements having a longitudinal axis and two sections twisted in opposite directions relative to said longitudinal axis.

2. The extraction tower according to claim 1, wherein said baffle elements are arranged in sets of three elements forming substantially an equilateral triangle surrounding said central shaft.

3. The extraction tower according to claim 1, wherein said securing means comprise three securing members for each baffle element, said three securing members connecting each baffle element to the tower housing at the ends of each baffle element and at the center of each baffle element.

4. The extraction tower according to claim 1, wherein said baffle elements are arranged in sets, and wherein each set of baffle elements is angularly displaced around the central shaft relative to an adjacent set of baffle elements.

5. The extraction tower according to claim 4, wherein each set comprises three baffle elements arranged to form substantially an equilateral triangle, and wherein each triangle is angularly displaced to an adjacent triangle by at least 60°.

6. The extraction tower according to claim 1, wherein each of said baffle elements comprises a center portion interconnecting said two sections, said center portion being twisted and said sections being plane but arranged at an angle relative to each other.

* * * * *